Dec. 15, 1959    H. D. WRIGHT ET AL    2,917,642
PRESSURE-RESPONSIVE TRANSDUCER
Filed Feb. 21, 1955
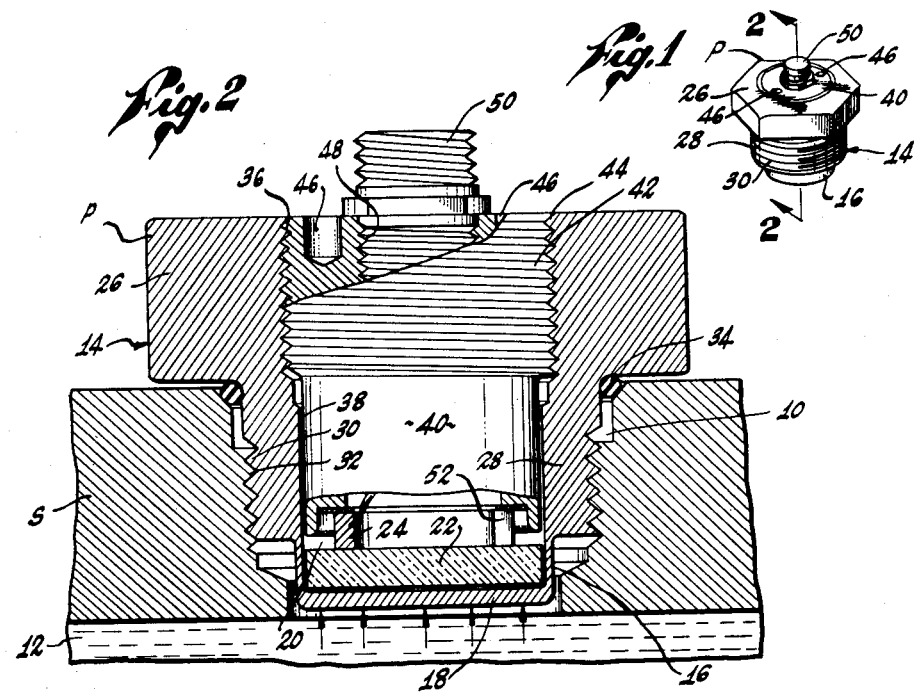
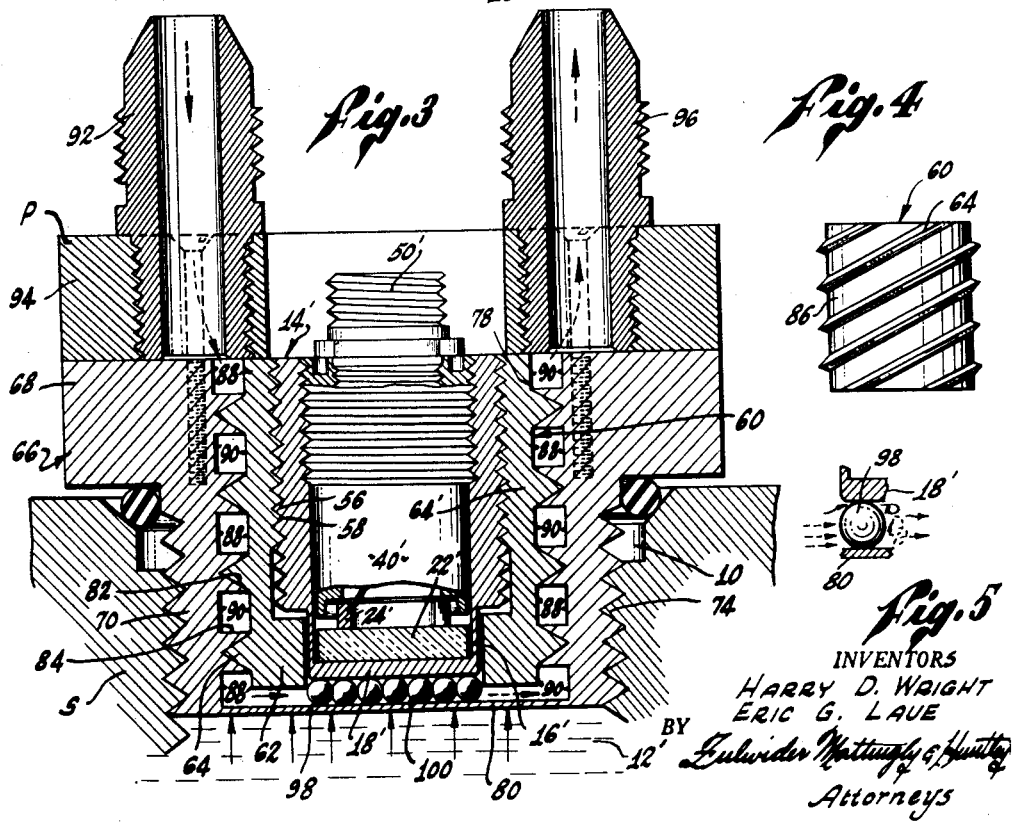
INVENTORS
HARRY D. WRIGHT
ERIC G. LAUE
BY
Attorneys

… … … …

United States Patent Office 2,917,642
Patented Dec. 15, 1959

2,917,642

PRESSURE-RESPONSIVE TRANSDUCER

Harry D. Wright, Altadena, and Eric G. Laue, San Gabriel, Calif.; said Laue assignor to said Wright Application February 21, 1955, Serial No. 489,570

23 Claims. (Cl. 310—8.3)

The present invention relates generally to the field of instrumentation and more particularly to a novel pressure-responsive transducer.

There have been heretofore proposed many types of pressure-responsive transducers for measuring transient pressures in a body of stationary or moving fluid. Certain of these heretofore-proposed devices have utilized a flexible metallic diaphragm disposed in contact with the fluid and assuming a catenary deflection as the pressure of the fluid changes. Such catenary deflection is transferred to a suitable sensor member, such as a piezoelectric crystal, and the electric voltage generated thereby is translated into measurable data. The bending of the crystal in a catenary form has the serious disadvantage of generating a voltage output that is non-linear with regard to the amount of stress applied to the crystal. Additionally, in order for the crystal to produce a reasonably large voltage output it is necessary to move its center through a comparatively large displacement, inasmuch as the ends of the crystal undergo little if any deflection. Hence, such devices have not afforded a high frequency response.

It is a major object of the present invention to provide an improved pressure-responsive transducer.

Another object of the invention is to provide a pressure-responsive transducer which is capable of producing a voltage output which is substantially linear with respect to the amount of pressure applied thereto.

A further object is to provide a pressure-responsive transducer having a comparatively high frequency response as compared to the heretofore-proposed devices of this type.

It is another object of the invention to provide a pressure-responsive transducer which is particularly adapted for use in measuring the pressure of a fast-moving fluid, inasmuch as its diaphragm may be mounted flush with the walls confining the moving fluid whereby the pressure of the transducer will not disturb the flow of such fluid.

It is a further object to provide a pressure-responsive transducer which is of small overall size and yet which affords a comparatively large voltage output for a given change in pressure.

An additional object is to provide a pressure-responsive transducer that is simple of design and rugged of construction whereby it may afford a long and trouble-free service life.

An important object of the present invention is to provide a new and improved fluid-cooled pressure-responsive transducer.

A further object is to provide a fluid-cooled pressure-responsive transducer which affords all of the advantages set forth hereinabove.

These and other objects and advantages of the present invention will become apparent from the following detailed description, when taken in conjunction with the appended drawings, wherein:

Figure 1 is a perspective view of a preferred form of pressure-responsive transducer embodying the present invention;

Figure 2 is an enlarged vertical sectional view taken on line 2—2 of Figure 1;

Figure 3 is a vertical sectional view taken through the center of a fluid-cooled pressure-responsive transducer embodying the present invention;

Figure 4 is a reduced perspective view of a breech cylinder utilized in the device of Figure 3; and Figure 5 is an enlarged view of the encircled area designated 5 in Figure 4.

Referring to the drawings and particularly Figures 1 and 2 thereof, a preferred form of pressure-responsive transducer P embodying the present invention is adapted to be mounted within an aperture 10 formed in a wall of a structure S wherein is confined a fluid 12. The pressure-responsive transducer P includes a body, generally designated 14, formed at one end with walls 16 that extend toward the fluid 12. A diaphragm 18 forms an integral closure for the ends of the walls 16 remote from the body 14 and cooperates with these walls to define a cavity 20. A detector member 22, such as a piezo-electric crystal, is disposed within the cavity 20. It is important to note that the diaphragm 18 is very stiff as compared to the walls 16 whereby the latter will have greater compliance in a direction away from the fluid 12 than does the diaphragm. Accordingly, when the fluid exerts a sufficient pressure against the underside of the diaphragm 18 the walls 16 will tend to collapse while the diaphragm remains stiff and moves away from the fluid, the side of the diaphragm 18 adjacent the crystal 22 applying a substantially equally distributed force against the crystal. The body 14 includes a backing element 24 for the crystal 22 and movement of the diaphragm 18 toward the body will therefore squeeze the crystal between the diaphragm and the backing element. Such deformation will cause the crystal to generate a voltage that may be measured in a conventional manner so as to provide an indication of the pressure applied by the fluid 12 against the diaphragm 18.

More particularly, the body 14 may conveniently be given a configuration resembling that of a conventional bolt whereby it may be readily threaded into the aperture 10 by means of a wrench. Thus, the body has a main portion that includes a hexagonal head 26 from which depends a coaxial tubular mounting element 28 externally formed with threads 30 engageable with complementary threads 32 formed in the aperture 10. The walls 16 form a tubular continuation of the inner portion of the mounting element 28, the walls being appreciably thinner than the sides of the mounting member. A suitable sealing ring 34 may be positioned between the body 14 and the outer end of the aperture 10. Preferably, the head 26, the mounting element 28, the walls 16 and the diaphragm 18 will be integral. Additionally, they will be so proportioned that the diaphragm 18 will not protrude into the fluid 12. With this arrangement, the pressure-responsive transducer P may be employed to measure the transient pressures in a fast moving fluid stream without disturbing the flow thereof.

The head 26 is coaxially formed with an internally threaded bore 36. The lower end of this bore 36 merges into the inner periphery 38 of the mounting element 28. The inner periphery of the mounting element in turn coincides with that of the walls 16. A generally tubular pre-loading stud 40 is disposed within the cylindrical space defined by the bore 36 and the inner periphery 38 of the mounting element 28, the upper portion of this stud being formed with threads 42 that engage complementary threads 44 formed in the bore 36. The upper end of the pre-loading stud 40 is formed with a pair of wrench-receiving sockets 46 and a coaxial threaded bore 48 that receives a suitable electrical connector element 50. The lower end of the pre-loading stud 40 abuts the upper end of the aforementioned backing element 24. Preferably, the latter will take the form of a ring from which a short circumferential section has been removed so as to leave a space 52. With this arrangement, the stud 40 may be tightened within the bore 36 so as to apply a predetermined amount of downward force against the backing element 24 and hence against the crystal 22. This is very important inasmuch as piezo-electric crystals operate most effectively when they are pre-stressed. The backing element 24 will serve as a lock washer to prevent inadvertent loosening of the pre-loading stud 40. In some instances it may be desirable for the walls 16 to be placed under tension by such a pre-loading operation.

A pressure-responsive transducer constructed in accordance with the foregoing description will provide excellent results in measuring transient pressures of stationary or moving fluids. Inasmuch as the entire crystal 22 is deformed by movement of the stiff diaphragm 18 toward the backing element 24, appreciable voltages may be generated upon even small deflections of the walls 16. The device affords a high natural frequency especially when the walls 16 are pre-stressed. In most instances the transducer may be directly connected to a cathode ray oscilloscope without preamplification.

Referring now to Figures 3, 4 and 5, there is shown a fluid-cooled pressure-responsive transducer P' embodying the present invention. This device is also adapted to be mounted within a circular aperture 10' formed in a wall of a structure S' wherein is confined a fluid 12' which exists at a high temperature. Referring to Figure 3, it will be observed that this form of pressure-responsive transducer includes a pressure-sensing unit that is generally similar to the one shown in detail in Figure 2. This unit includes a body 14' having compliant walls 16', a stiff diaphragm 18', a crystal 22', a pre-loading stud 40' and a backing element 24' corresponding to parts in Figure 2 designated with similar unprimed reference numerals.

The body 14', however, is not formed with a head but instead it is of uniform outside diameter and is formed with external threads 56 along its entire length. The latter are engaged with complementary threads 58 formed upon the inner periphery of a generally tubular breech cylinder, generally designated 60. The lower portion of the breech cylinder 60 is formed with a radially inwardly extending collar 62 which encloses the outer periphery of the walls 16' and the diaphragm 18'. As indicated in Figure 4, the outer surface of the breech cylinder 60 is formed with a plurality of axially spaced, diagonally inclined projections 64 of triangular cross-section.

The breech cylinder 60 is coaxially disposed within a mounting body, generally designated 66 that includes a hexagonal head 68 from which extends an integral mounting member 70. The latter is formed with external threads 72 engageable with complementary threads 74 formed in the aperture 10'. The head 68 and the mounting member 70 are coaxially formed with an annular chamber 78 extending from the exterior of the head to the surface of a closure plate 80 that integrally joins the end of the mounting member remote from the head. The periphery of this annular chamber 78 is formed with a helical groove 82 having a triangular cross-section and pitch complementary to the projections 64 formed on the exterior of the breech cylinder 60. This chamber 78 is likewise formed with a helical groove 84 of square cross-section but having the same pitch as the groove 82. The grooves 82 and 84 may conveniently be obtained by first forming a four-pitch thread in the inner periphery of the annular chamber 78 and then removing every other thread. With this arrangement, when the projections 64 of the breech cylinder 60 are threaded into the triangular groove 82, the other groove 84 will cooperate with the axially extending surfaces 86 between the projections 64 to define a helical inlet passage 88 and a helical outlet passage 90 for the cooling fluid utilized to cool the transducer. Cooling fluid may be introduced into the upper end of the passage 88 through a suitable nipple 92 shown threadably secured to an adaptor ring 94, the latter being affixed to the head 68. A similar nipple 96 may conduct the cooling fluid out of the upper end of the other passage 90. After travelling downwardly through the passage 88 the cooling fluid flows between the upper surface of the closure plate 80 and the underside of the breech cylinder 60 and the diaphragm 18'. As indicated in Figure 2, the lower end of the breech cylinder 60 terminates closer to the closure plate 80 than the diaphragm 18' and a plurality of balls 98 are disposed within the annular space 100 so defined. The balls 98 may be formed of a hard metallic or ceramic material.

In assembling the fluid-cooled pressure-responsive transducer P' the balls 98 will be placed in compression when the body 14' is tightened within the breech cylinder 60 and the latter has been tightened within the annular chamber 78 of the mounting body 66. Hence, any inward deflection of the closure plate 80 under the influence of the fluid 12' will effect concurrent parallel deflection of the sensory diaphragm 18'. For this reason, the pressure-responsive transducer P' will provide a high natural frequency response.

Referring to Figure 5, it should be especially noted that the flow of the cooling fluid over each of the balls 98 will be essentially laminar over the half facing the inlet passage 88 but extremely turbulent over the other half. In this manner, the heat transfer between the cooling fluid and the balls 98, closure plate 80 and the sensory diaphragm 18' will be very effective. Likewise, the balls provide a maximum area in contact with the coolant fluid. It should also be noted that the balls 98 will have only a point contact with the closure plate 80 and the sensory diaphragm 18'. Accordingly, the heat transfer between the balls and the latter two components will be but slight.

A fluid-cooled pressure-responsive transducer constructed in accordance with the foregoing description will provide very accurate results even where exposed to fluids existing at high temperatures. Because of the effective utilization of the cooling fluid, the temperature of the crystal 22' will remain well within the limits required for effective operation. In practice it has been found that a crystal formed of $BaTiO_3$ or $BaTiO_4$ will provide excellent results when employed with the pressure-responsive transducer shown and described herein.

While there has been shown and described what are presently considered to be two preferred embodiments of the present invention, it will be apparent that various changes and modifications may be made thereto without departing from the spirit of the invention or the scope of the following claims.

We claim:

1. A temperature-controlled pressure-responsive transducers for use with a body of fluid, comprising: a body member having a closure element adapted to be contacted externally of said body member by the body of fluid; a pressure-sensing unit mounted in said body member and including a diaphragm spaced from said closure element; passage means for conducting the temperature-regulating fluid through the space separating said closure element and said diaphragm; and, a plurality of rigid ball-like elements in said space interposed between said closure element and said diaphragm so as to effect concurrent parallel deflection thereof upon a predetermined change in the pressure of said body of fluid.

2. A temperature-controlled pressure-responsive transducer as set forth in claim 1 where said pressure-sensing unit includes walls interposed between said diaphragm and said body member, said walls having a greater compliance away from said closure element than said diaphragm whereby the latter will remain substantially undeformed while undergoing said deflection.

3. A temperature-controlled pressure-responsive transducer as set forth in claim 2 where said pressure-sensing unit includes a detector member abutting said diaphragm and having a part thereof that is remote from said diaphragm restrained against movement away from said closure element.

4. A temperature-controlled pressure-responsive transducer as set forth in claim 3 where said pressure-sensing unit includes a pre-loading element adjustably movable toward and away from said detector member.

5. A temperature-controlled pressure-responsive transducer for use with a body of fluid, comprising: a mounting body formed with a coaxial bore that terminates with a flexible closure plate adapted to contact said body of fluid; a breech cylinder disposed in said bore; a tubular body disposed in said cylinder; a tubular wall extending from the end of said tubular body adjacent said closure plate; a diaphragm forming a closure for said wall and cooperating therewith to define a cavity, said diaphragm being spaced from said closure plate; a detector member disposed in said cavity and having an extended surface thereof connected with the inner surface of said diaphragm over said extended surface and being responsive to pressure applied to said extended surface in response to displacement of said diaphragm; a pre-loading member adjustably carried by said tubular body for axial movement toward and away from said detector member; passage means formed between said mounting body and said breech cylinder for conducting temperature-regulating fluid through the space separating said closure plate and said diaphragm; and, a plurality of rigid ball-like elements in said space interposed between said closure plate and said diaphragm so as to effect concurrent parallel deflection thereof upon a predetermined change in the pressure of said body of fluid, said walls having a greater compliance away from said closure element than does said diaphragm whereby the latter will remain substantially undeformed while undergoing said deflection.

6. A temperature-controlled pressure-responsive transducer as set forth in claim 5 where said detector member is a piezo-electric substance.

7. A temperature-controlled pressure-responsive transducer as set forth in claim 5 where said tubular body is threadedly secured within said cylinder, and said pre-loading member is threadedly secured within said body.

8. A temperature-controlled pressure-responsive transducer as set forth in claim 5 where the outer surface of the breech cylinder is formed with a plurality of axially spaced, diagonally inclined projections, and the coaxial bore of the mounting body is formed with a first helical groove having a cross-section and pitch complementary to said projections, and a second helical groove having the same pitch as the first groove, said second helical groove cooperating with the exterior of said breech cylinder to form said passage means.

9. A temperature-controlled pressure-responsive transducer as set forth in claim 8 where said tubular body is threadedly secured within said cylinder, and said pre-loading member is threadedly secured within said body.

10. A temperature-controlled pressure-responsive transducer as set forth in claim 9 where the end of said breech cylinder adjacent said closure plate is axially spaced therefrom and is formed with a radially inwardly extending collar that encircles said wall and diaphragm, said cylinder terminating closer to said closure plate than said diaphragm, and said ball-like elements being disposed in the space within said cylinder.

11. A temperature-controlled pressure-responsive transducer as set forth in claim 10 where said detector member is a piezo-electric crystal and a backing element consisting of a non-continuous ring is interposed between said pre-loading member and said crystal.

12. A temperature-controlled pressure-responsive transducer for use with a body of fluid, comprising: a body member having a closure element adapted to be contacted externally of said body member by the body of fluid; a pressure-sensing unit mounted in said body member and including a diaphragm spaced from said closure element; passage means for conducting temperature-regulating fluid through the space separating said closure element and said diaphragm; and a plurality of spacers compressibly mounted between said closure element and said diaphragm, said spacers having spaces between them so as to effect concurrent parallel deflection thereof upon a predetermined change in the pressure of said body of fluid.

13. A temperature-controlled pressure-responsive transducer as defined in claim 12 wherein said closure element is in the form of a diaphragm that has a diameter that is large compared with that of said first-mentioned diaphragm.

14. A temperature-controlled pressure-responsive transducer as defined in claim 12 wherein said closure element is in the form of a diaphragm that is thin compared with said first-mentioned diaphragm.

15. A pressure-responsive transducer for use with a fluid, comprising a casing body having a main portion, a diaphragm spaced therefrom along an axis, and a tubular wall member extending from said main portion in the direction of said axis and joining said main portion and said diaphragm, said diaphragm cooperating with said main portion and said tubular portion to define a cavity that is fluid-tight at the diaphragm end; a backing element formed on said body opposite said diaphragm; and a detector member comprising a body of pressure-sensitive material disposed in said cavity between said diaphragm and said backing element and having an extended surface thereof connected with the inner surface of said diaphragm over said extended surface and being responsive to pressure applied to said extended surface in response to displacement of said diaphragm, said wall member having greater compliance toward and away from said detector member than does said diaphragm whereby the surface of said diaphragm adjacent said detector member applies a substantially evenly distributed force against said extended surface of said detector member upon a pre-determined change in the pressure of said fluid.

16. A pressure-responsive transducer as set forth in claim 15 where said detector member generates an electrical voltage when it is deformed.

17. A pressure-responsive transducer as set forth in claim 16 where said pressure-sensitive material is a piezo-electric substance.

18. A pressure-responsive transducer for use with a fluid, comprising: a casing having a main portion and walls extending from said main portion and having a diaphragm forming a closure for the end of said walls remote from the point of connection thereof with said main portion, said diaphragm cooperating with said walls to define a cavity that is fluid-tight at the diaphragm end thereof; a backing element formed on said body opposite said diaphragm; a detector member comprising a body of pressure-sensitive material disposed in said cavity between said diaphragm and said backing element and having an extended surface thereof connected with the inner surface of said diaphragm over said extended surface and being responsive to pressure applied to said extended surface in response to displacement of said diaphragm; a pre-loading stud adjustably positioned in said main portion bore for movement toward and away from said detector member, said walls having greater compliance toward and away from said pre-loading stud than does said diaphragm, whereby said diaphragm applies a substantially equally distributed force against said extended surface of said detector member upon a pre-determined increase in the pressure of said fluid.

19. A pressure-responsive transducer as set forth in claim 18 comprising a backing element consisting of a non-continuous ring interposed between said preloading stud and said detector member.

20. A pressure-responsive transducer for use with a fluid, comprising: a tubular casing having a main tubular portion from one end of which extends a coaxial tubular wall of reduced thickness and having a diaphragm forming a closure for the end of said wall remote from said main portion and cooperating with said wall to define a cavity that is fluid-tight at said remote end; a detector member comprising a body of pressure-sensitive material disposed in said cavity and having an extended surface thereof connected with the inner surface of said diaphragm over said extended surface and being responsive to pressure applied to said extended surface in response to displacement of said diaphragm; a pre-loading stud adjustably positioned in said main tubular portion for movement toward and away from said detector member; and a lock washer coaxially interposed between said detector member and said stud, said walls having greater compliance toward and away from said pre-loading stud than does said diaphragm whereby said diaphragm applies a substantially evenly distributed force against said extended surface of said detector member upon a pre-determined change in the pressure of said fluid.

21. A pressure-responsive transducer as set forth in claim 20 where said pressure-sensitive material is a piezoelectric crystal.

22. A pressure responsive transducer as defined in claim 15 wherein said casing body is provided with means for installation in sealing relationship in an opening of a wall member to expose said diaphragm to fluid under pressure.

23. A pressure responsive transducer as in claim 15 wherein said case body is threaded for installation in a threaded opening of a wall member for exposing said diaphragm to fluid under pressure.

References Cited in the file of this patent
UNITED STATES PATENTS

| | | |
|---|---|---|
| 2,406,792 | Beinoff | Sept. 3, 1946 |
| 2,494,433 | Erwin | Jan. 10, 1950 |
| 2,507,636 | Kristler | May 16, 1950 |
| 2,661,622 | Severs | Dec. 8, 1953 |
| 2,714,672 | Wright et al. | Aug. 2, 1955 |